US011580593B2

(12) United States Patent
Onodera et al.

(10) Patent No.: US 11,580,593 B2
(45) Date of Patent: Feb. 14, 2023

(54) FEE SETTING DEVICE, METHOD AND SYSTEM

(71) Applicant: TOYOTA JIDOSHA KABUSHIKI KAISHA, Toyota (JP)

(72) Inventors: Aya Onodera, Nisshin (JP); Akihiko Nakanishi, Nisshin (JP); Takumi Hamajima, Osaka (JP); Yusuke Tsutsui, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 16/179,388

(22) Filed: Nov. 2, 2018

(65) Prior Publication Data

US 2019/0139130 A1 May 9, 2019

(30) Foreign Application Priority Data

Nov. 6, 2017 (JP) .............................. JP2017-213947

(51) Int. Cl.
*G06Q 30/06* (2012.01)
*G06Q 30/0645* (2023.01)
*G07F 15/00* (2006.01)
*G06Q 30/0283* (2023.01)

(52) U.S. Cl.
CPC ..... *G06Q 30/0645* (2013.01); *G06Q 30/0284* (2013.01); *G07F 15/005* (2013.01)

(58) Field of Classification Search
CPC ............ G06Q 30/0645; G06Q 30/0284; G07F 15/005
See application file for complete search history.

(56) References Cited

U.S. PATENT DOCUMENTS

| 6,850,898 B1 | 2/2005 | Murakami et al. |
| 8,649,260 B2 * | 2/2014 | All .................. G08B 25/009 701/31.5 |
| 2003/0101107 A1 * | 5/2003 | Agarwal ............ G06Q 10/087 705/28 |
| 2003/0112124 A1 * | 6/2003 | Gudmundsson .. H04W 52/0216 340/7.38 |

(Continued)

FOREIGN PATENT DOCUMENTS

| EP | 3220317 A1 | 9/2017 |
| JP | 2002245585 A | 8/2002 |

(Continued)

OTHER PUBLICATIONS

Wang, Rui, A Real-time, Robust Control Strategy for Plug-in Hybrid Electric Vehicles, North Carolina State University, 2015.*

*Primary Examiner* — Nathan Erb
(74) *Attorney, Agent, or Firm* — Hunton Andrews Kurth LLP

(57) ABSTRACT

When a process of returning a vehicle is performed, a fee setting device identifies a zone where the vehicle is returned, and calculates the identified zone's zone SOC. The fee setting device determines whether a discount for leveling is applicable. The fee setting device compares a zone SOC of a zone where a user rented a vehicle and a zone SOC of a zone where the user returned the vehicle. When the zone SOC of the zone where the user rented the vehicle is larger than the zone SOC of the zone where the user returned the vehicle, the discount for leveling is applied.

6 Claims, 13 Drawing Sheets

(56) References Cited

U.S. PATENT DOCUMENTS

| | | | |
|---|---|---|---|
| 2008/0162059 A1* | 7/2008 | Murakami | G01R 31/367 702/63 |
| 2013/0218405 A1* | 8/2013 | Ishiguma | B60L 53/65 701/34.4 |
| 2013/0246104 A1* | 9/2013 | Weinstock | G06Q 10/02 705/5 |
| 2013/0257145 A1* | 10/2013 | Caldeira | B60L 53/14 307/9.1 |
| 2014/0207498 A1 | 7/2014 | Cho | |
| 2015/0310379 A1* | 10/2015 | Farrelly | G06Q 10/20 705/7.15 |
| 2015/0321672 A1* | 11/2015 | Schondorf | G06Q 90/00 701/22 |
| 2016/0260058 A1* | 9/2016 | Benjamin | G06Q 10/0832 |
| 2017/0352093 A1* | 12/2017 | Armelin | G06F 16/9535 |
| 2018/0048155 A1* | 2/2018 | Utamaru | H02J 7/0068 |

FOREIGN PATENT DOCUMENTS

| | | |
|---|---|---|
| JP | 2003-162576 A | 6/2003 |
| JP | 2007114854 A | 5/2007 |
| JP | 2014219749 A | 11/2014 |
| JP | 2016-130944 A | 7/2016 |
| JP | 2016146029 A | 8/2016 |
| JP | 2017005776 A | 1/2017 |
| JP | 2017162370 A | 9/2017 |
| WO | 02/065325 A2 | 8/2002 |
| WO | WO-2016/136260 A1 * | 9/2016 ................ H02J 3/32 |

* cited by examiner

FIG.4

| VEHICLE INFORMATION | USER ID | SOC | POSITION | ZONE | STATION |
|---|---|---|---|---|---|
| 300 | xxxxx | 40% | XX | 1ST ZONE | 1ST STATION |
| 310 | — | 70% | YY | 1ST ZONE | 1ST STATION |
| ⋮ | ⋮ | ⋮ | ⋮ | ⋮ | ⋮ |
| 340 | — | 100% | ZZ | 2ND ZONE | 4TH STATION |
| ⋮ | ⋮ | ⋮ | ⋮ | ⋮ | ⋮ |

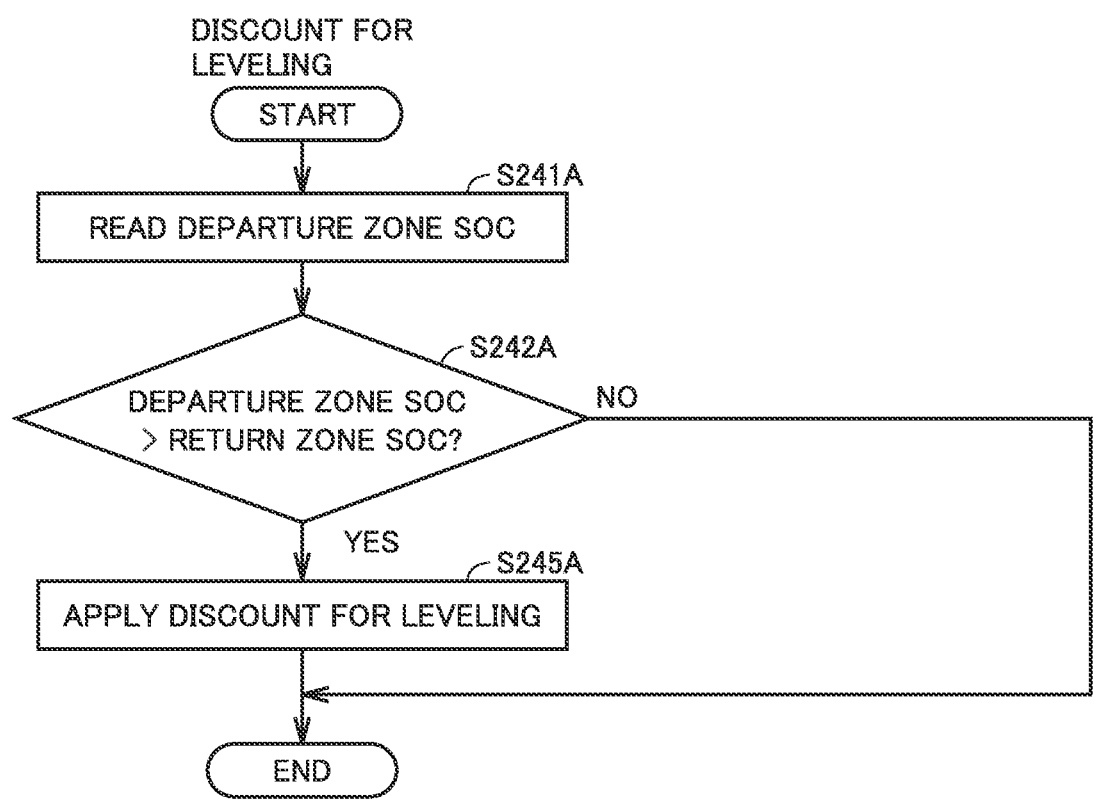

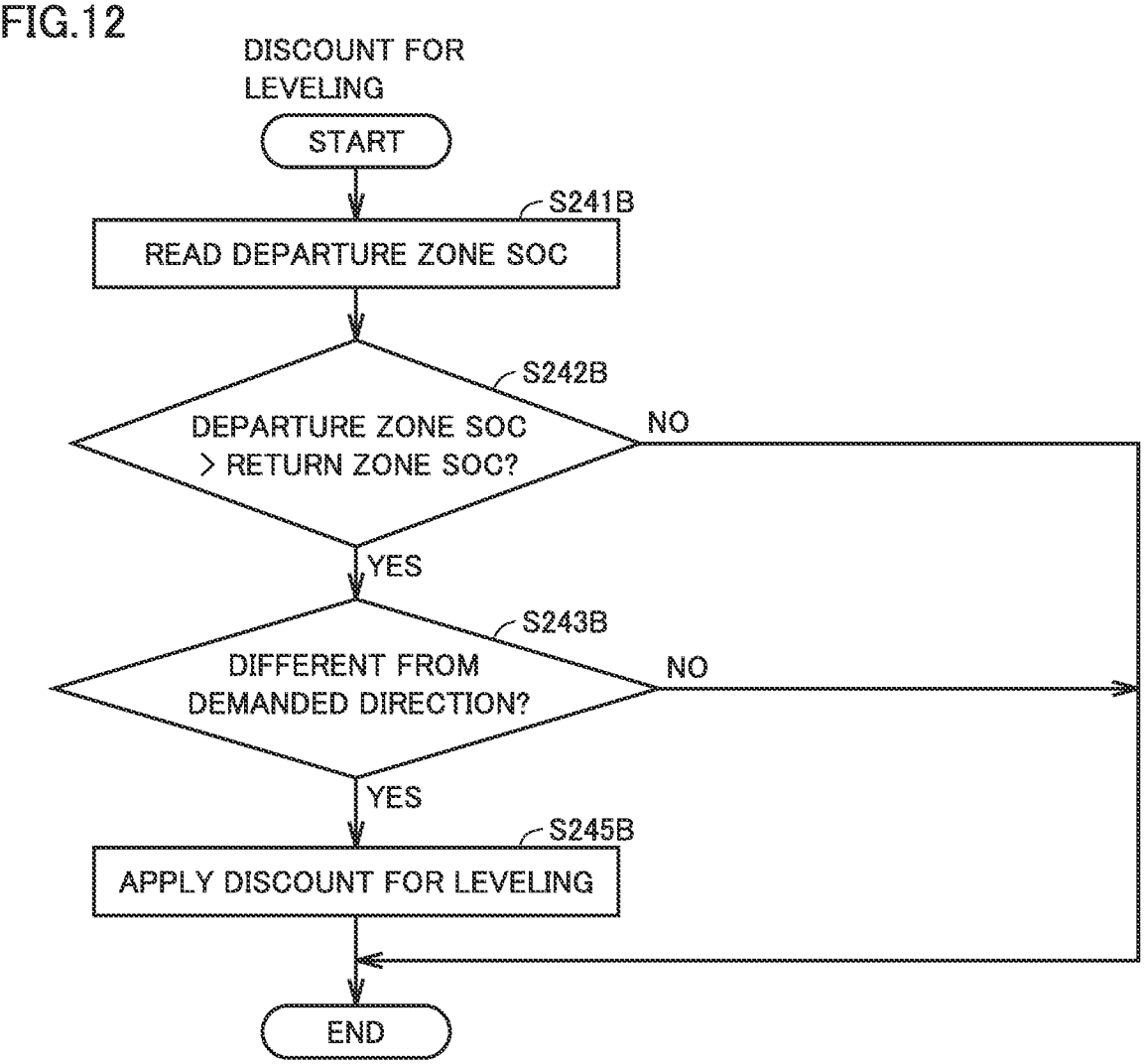

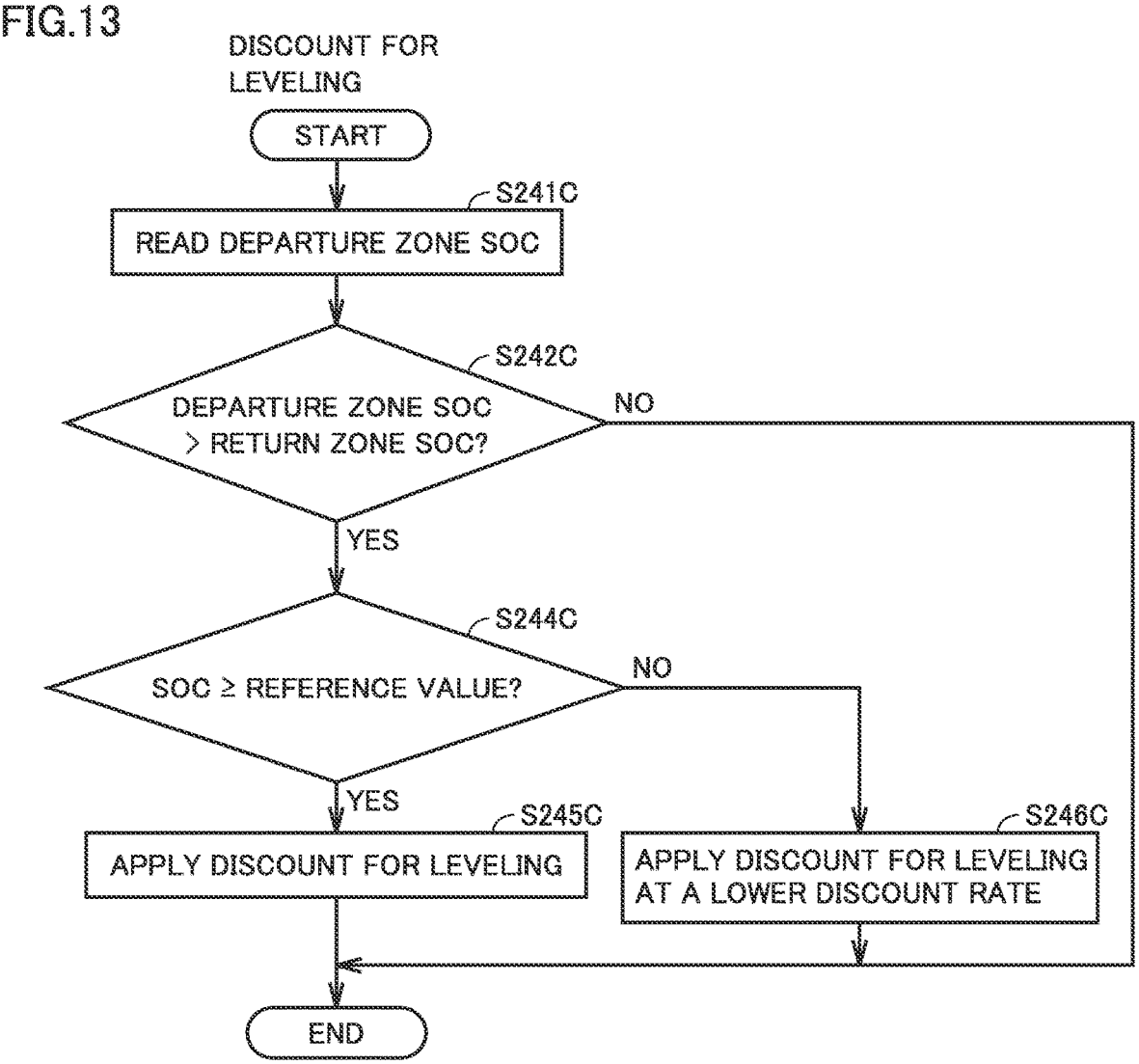

FEE SETTING DEVICE, METHOD AND SYSTEM

This nonprovisional application is based on Japanese Patent Application No. 2017-213947 filed on Nov. 6, 2017 with the Japan Patent Office, the entire contents of which are hereby incorporated by reference.

BACKGROUND

Field

The present disclosure relates to setting a utilization fee for car-sharing for a vehicle such as an electric vehicle traveling using power stored in a power storage device.

Description of the Background Art

Car sharing allowing a plurality of users to share a single vehicle is increasingly utilized. Car sharing means that a user himself/herself does not own a vehicle and instead obtains membership of a car sharing business operation and appropriately utilizes a vehicle owned by the business operator.

In such car sharing, a user who rented a vehicle at a place may return the vehicle at a place different from the place where the user rented the vehicle. This may cause an uneven distribution between vehicle renting locations in how many vehicles are rentably parked in each location.

Japanese Patent Laying-Open No. 2003-162576 discloses a system in which when an uneven distribution is detected between the number of vehicles in a vehicle renting location and the number of vehicles in another vehicle renting location, a user is requested to return a vehicle at a location which is different than initially scheduled to resolve the uneven distribution.

SUMMARY

In recent years, electric vehicles are also increasingly used in car sharing. Generally, an electric vehicle requires a longer period of time when the electric vehicle is replenished with driving energy than a gasoline-powered vehicle driven by an internal combustion engine to run.

Accordingly, there is a demand in sharing an electric vehicle for a scheme which resolves not only an uneven distribution between the number of vehicles in a vehicle renting location and the number of vehicles in another vehicle renting location but also an uneven distribution between an amount of power stored in vehicles in a vehicle renting location and an amount of power stored in vehicles in another vehicle renting location.

According to the present disclosure, a fee setting device is a fee setting device configured to set a utilization fee for sharing a vehicle configured to travel using power stored in a power storage device. The present fee setting device comprises: an information acquisition unit configured to obtain from the vehicle first information representing an amount of power stored in the power storage device and second information representing a position of the vehicle; a zone identifying unit configured to identify a zone where the vehicle is parked by using the second information obtained by the information acquisition unit and zone setting information, the zone setting information dividing into a plurality of zones a predetermined region including a plurality of locations where the vehicle can be rented and returned; a calculator configured to calculate, by using the first information, an amount representing a sum of amounts of power stored in vehicles parked in the identified zone; and a fee setting unit configured to set the utilization fee. When a second amount representing a sum of amounts of power stored in vehicles parked in a zone including a return location of the vehicle is less than a first amount representing a sum of amounts of power stored in vehicles parked in a zone including a renting location of the vehicle, the fee setting unit is configured to set the utilization fee to be a smaller amount than when the second amount is larger than the first amount. The return location is a location where the vehicle has been returned, and the renting location is a location where the vehicle has been rented.

According to another aspect of the present disclosure, a method is a fee setting method for setting a utilization fee for sharing a vehicle configured to travel using power stored in a power storage device. The present method comprises: obtaining from the vehicle first information representing an amount of power stored in the power storage device and second information representing a position of the vehicle; identifying a zone where the vehicle is parked by using the obtained second information and zone setting information, the zone setting information dividing into a plurality of zones a predetermined region including a plurality of locations where the vehicle can be rented and returned; calculating, by using the first information, an amount representing a sum of amounts of power stored in vehicles parked in the identified zone; and setting the utilization fee. When a second amount representing a sum of amounts of power stored in vehicles parked in a zone including a return location of the vehicle is less than a first amount representing a sum of amounts of power stored in vehicles parked in a zone including a renting location of the vehicle, the setting the utilization fee includes setting the utilization fee to be a smaller amount than when the second amount is larger than the first amount, the return location being a location where the vehicle has been returned, the renting location being a location where the vehicle has been rented.

According to still another aspect of the present disclosure, a fee setting system comprises: a vehicle configured to travel using power stored in a power storage device; and a fee setting device configured to set a fee for sharing the vehicle. The fee setting device is configured to: obtain from the vehicle first information representing an amount of power stored in the power storage device and second information representing a position of the vehicle; identify a zone where the vehicle is parked by using the obtained second information and zone setting information, the zone setting information dividing into a plurality of zones a predetermined region including a plurality of locations where the vehicle can be rented and returned; calculate, by using the first information, an amount representing a sum of amounts of power stored in vehicles parked in the identified zone; set the utilization fee; and set the utilization fee to be a smaller amount when a second amount representing a sum of amounts of power stored in vehicles parked in a zone including a return location of the vehicle is less than a first amount representing a sum of amounts of power stored in vehicles parked in a zone including a renting location of the vehicle than when the second amount is larger than the first amount, the return location being a location where the vehicle has been returned, the renting location being a location where the vehicle has been rented.

According to the above configuration, a predetermined region including a plurality of locations where a vehicle can be rented and returned is divided into a plurality of zones. And when the vehicle is returned, and the second amount is smaller than the first amount, a utilization fee of a smaller amount than when the second amount is larger than the first amount is set. This promotes a movement to a zone having a smaller sum of amounts of power stored in vehicles parked therein than the first amount. As a result, an uneven distribution between a sum of amounts of power stored in vehicles parked in a zone and a sum of amounts of power stored in vehicles parked in another zone can be leveled and the vehicle can be utilized more efficiently.

Preferably, when a first condition is that the second amount is smaller than the first amount and a direction from the zone including the renting location toward the zone including the return location is different from a demanded direction representing a direction in which movement between the zones concentrates and a second condition is that the second amount is smaller than the first amount and the direction from the zone including the renting location toward the zone including the return location is identical to the demanded direction, the fee setting unit is configured to set the utilization fee to be a smaller amount for the first condition than for the second condition.

The above configuration promotes a movement that returns a rented vehicle to a location included in a zone storing a smaller amount of power than the zone including the location where the vehicle has been rented and that is a movement in a direction different from a demanded direction. This can disperse movement in a direction in which vehicles' movements concentrate, and can thus suppress concentration of vehicles in a specific zone. Thus, an uneven distribution between a sum of amounts of power stored in vehicles parked in a zone and a sum of amounts of power stored in vehicles parked in another zone can be leveled and vehicles can be utilized more efficiently.

Preferably, when the vehicle is returned with power stored therein in an amount larger than a reference value, the fee setting unit is configured to set the utilization fee to be a smaller amount than when the vehicle is returned with power stored therein in an amount smaller than the reference value.

According to the above configuration, when a vehicle is returned with power stored therein in an amount larger than a reference value, a utilization fee of a low amount is set, and returning the vehicle with power stored therein in an amount larger than the reference value is thus promoted. This allows the returned vehicle to be electrically charged in a reduced period of time and hence utilized more efficiently.

Preferably, when the zone including the return location has a total number of vehicles less than or equal to a predetermined number, the fee setting unit is configured to set the utilization fee to be a smaller amount than when the zone including the return location has a total number of vehicles larger than the predetermined number.

According to the above configuration, when a vehicle is returned to a zone having an insufficient total number of vehicles, a utilization fee of a small amount is set. This can resolve an uneven distribution between a total number of vehicles rentably parked in a zone and that of vehicles rentably parked in another zone.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram showing an example of a configuration of a vehicle information list stored in the fee setting device.

FIG. 11 is a flowchart showing a process performed by the fee setting device according to a first modification in determining whether to apply a discount for leveling.

FIG. 12 is a flowchart showing a process performed by the fee setting device according to a second modification in determining whether to apply a discount for leveling.

FIG. 13 is a flowchart showing a process performed by the fee setting device according to a third modification in determining whether to apply a discount for leveling.

DESCRIPTION OF THE PREFERRED EMBODIMENTS

The present disclosure will now be described in embodiments hereinafter in detail with reference to the drawings. In the figures, identical or corresponding components are identically denoted and will not be described repeatedly.

Configuration of Sharing System

Figure 1:
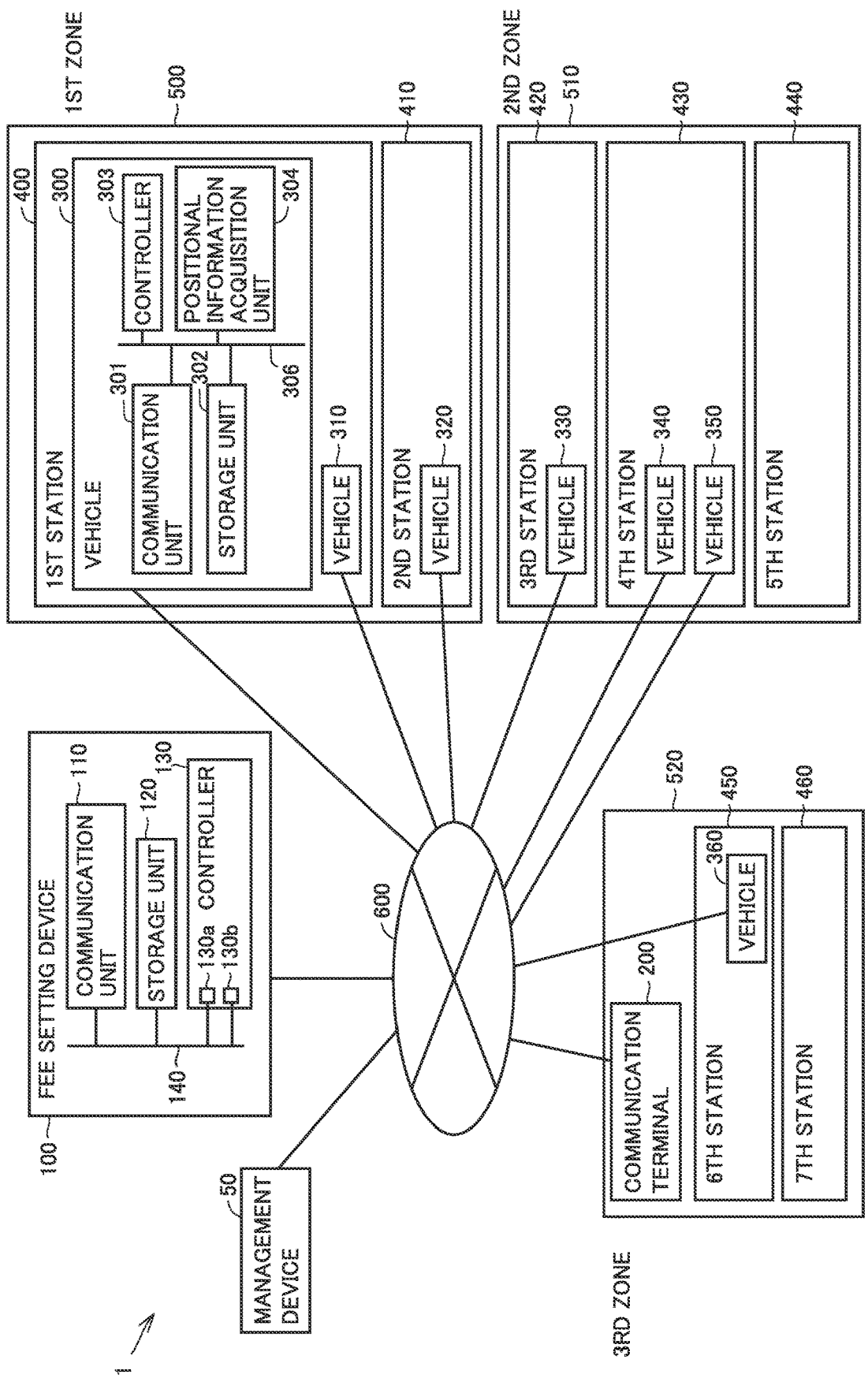
FIG. 1 is a diagram schematically showing an overall configuration of a sharing system according to an embodiment.

FIG. 1 is a diagram schematically showing an overall configuration of a sharing system 1 according to an embodiment. As shown in FIG. 1, sharing system 1 according to the present embodiment includes a management device 50, a fee setting device 100, a communication terminal 200, and vehicles 300-360 each traveling using power stored in a power storage device (hereinafter, also simply referred to as a "vehicle").

Management device 50 manages a car sharing service using sharing system 1. For example, management device 50 manages reservation of vehicles used for the car sharing service, statuses of the vehicles, such as whether they are rented/returned, and so forth.

Communication terminal 200 is a communication terminal used by a user of sharing system 1 according to the present embodiment, and is, for example, a smartphone, a personal computer, or the like. Using communication terminal 200, the user communicates with management device 50 to perform membership registration for the car sharing service, reserve a vehicle, and so forth. Vehicles 300-360 are electric vehicles, plug-in hybrid vehicles and the like for example. In the following description, an example will be described in which vehicles 300-360 are electric vehicles. In addition, in the present embodiment, a fee setting system which sets a utilization fee for car sharing is configured to include fee setting device 100 and vehicles 300-360. While in the present embodiment an example is indicated in which management device 50 and fee setting device 100 are discretely provided, management device 50 and fee setting device 100 may be configured as a single device equipped with their functions.

Fee setting device 100 includes a communication unit 110, a storage unit 120, and a controller 130. Each component is communicatively connected by a communication bus 140.

Communication unit 110 is configured to be capable of communicating with communication unit 301 of vehicle 300. Communication units 110 and 301 communicate with each other via a communication network 600 such as the Internet or a telephone line. Furthermore, communication unit 110 is also capable of communicating with vehicles 310-360.

Furthermore, communication unit 110 is configured to be capable of communicating with communication terminal 200, management device 50, and the like. Communications between communication unit 110, and communication terminal 200, management device 50 and the like are also performed via communication network 600.

Storage unit 120 includes, for example, a large-capacity storage device such as a hard disk or a solid state drive. Storage unit 120 has stored therein information of users holding membership in the car sharing, positional information of stations, and the like. Furthermore, storage unit 120 stores a vehicle information list 700 having a state of charge (SOC) of each of the plurality of vehicles 300-360, positional information thereof, and the like stored therein. Vehicle information list 700 will more specifically be described later.

Controller 130 includes a CPU (central processing unit) 130a, a memory (ROM and RAM) 130b, an input/output port (not shown) for inputting/outputting various signals, and the like. Controller 130 is configured to execute predetermined computation processing based on information stored in storage unit 120, information received from vehicle 300 via communication unit 110, and/or the like. Controller 130 will more specifically be described later.

Vehicle 300 includes a communication unit 301, a storage unit 302, a controller 303, and a positional information acquisition unit 304. Each component is communicatively connected by a communication bus 306. Hereinafter, the description of vehicle 300 is also applicable to vehicles 310-360.

Communication unit 301 is configured to be capable of communicating with communication unit 110 of fee setting device 100. Communication units 110 and 301 communicate with each other via communication network 600.

Communication unit 301 is configured to be capable of communicating with communication terminal 200, management device 50 and the like. Communications between communication unit 301, and communication terminal 200, management device 50 and the like are performed via communication network 600.

Storage unit 302 is, for example, a storage device including a nonvolatile memory, a hard disk, a solid state drive or the like. Storage unit 302 stores, for example, information of an SOC of a power storage device mounted in vehicle 300, information of the position of vehicle 300, and the like.

Controller 303 includes, for example, a CPU, a memory (ROM and RAM), and an input/output port for inputting and outputting various signals, none of which is shown. Controller 303 is configured to execute predetermined computation processing based on information stored in storage unit 302.

Further, controller 303 monitors a state of the power storage device mounted in vehicle 300. For example, controller 303 senses the power storage device's voltage, current, and temperature and uses these values to calculate the power storage device's SOC. The calculation of the SOC may be done using any well-known technique, and accordingly, will not be described specifically.

Furthermore, when vehicle 300 has shifted from the READY-OFF state to the READY-ON state, controller 303 transmits to fee setting device 100 via communication unit 301 start-of-utilization information serving as notification that utilization of vehicle 300 starts, and vehicle information serving as information for identifying vehicle 300. When vehicle 300 has shifted from the READY-ON state to the READY-OFF state, controller 303 transmits to fee setting device 100 end-of-utilization information serving as notification that utilization of vehicle 300 ends.

Positional information acquisition unit 304 is configured to obtain a current position of vehicle 300. For example, positional information acquisition unit 304 uses a GPS (Global Positioning System) to obtain the current position of vehicle 300. Positional information acquisition unit 304 transmits to controller 303 positional information indicating the obtained current position of vehicle 300. Note that the positional information corresponds to "second information" according to the present disclosure.

Controller 303 causes storage unit 302 to store information of a calculated SOC, the positional information received from positional information acquisition unit 304 and the like. While vehicle 300 is in the READY-ON state and the power storage device is being charged, controller 303 periodically transmits to fee setting device 100 the information of the calculated SOC and the positional information obtained by positional information acquisition unit 304. Further, in response to a request from fee setting device 100, controller 303 transmits vehicle 300's SOC information and positional information to fee setting device 100 via communication unit 301. Further, controller 303 also transmits vehicle 300's SOC information and positional information to fee setting device 100 via communication unit 301 when vehicle 300 shifts from the READY-ON state to the READY-OFF state. Note that the SOC information corresponds to "first information" according to the present disclosure.

Figure 2:
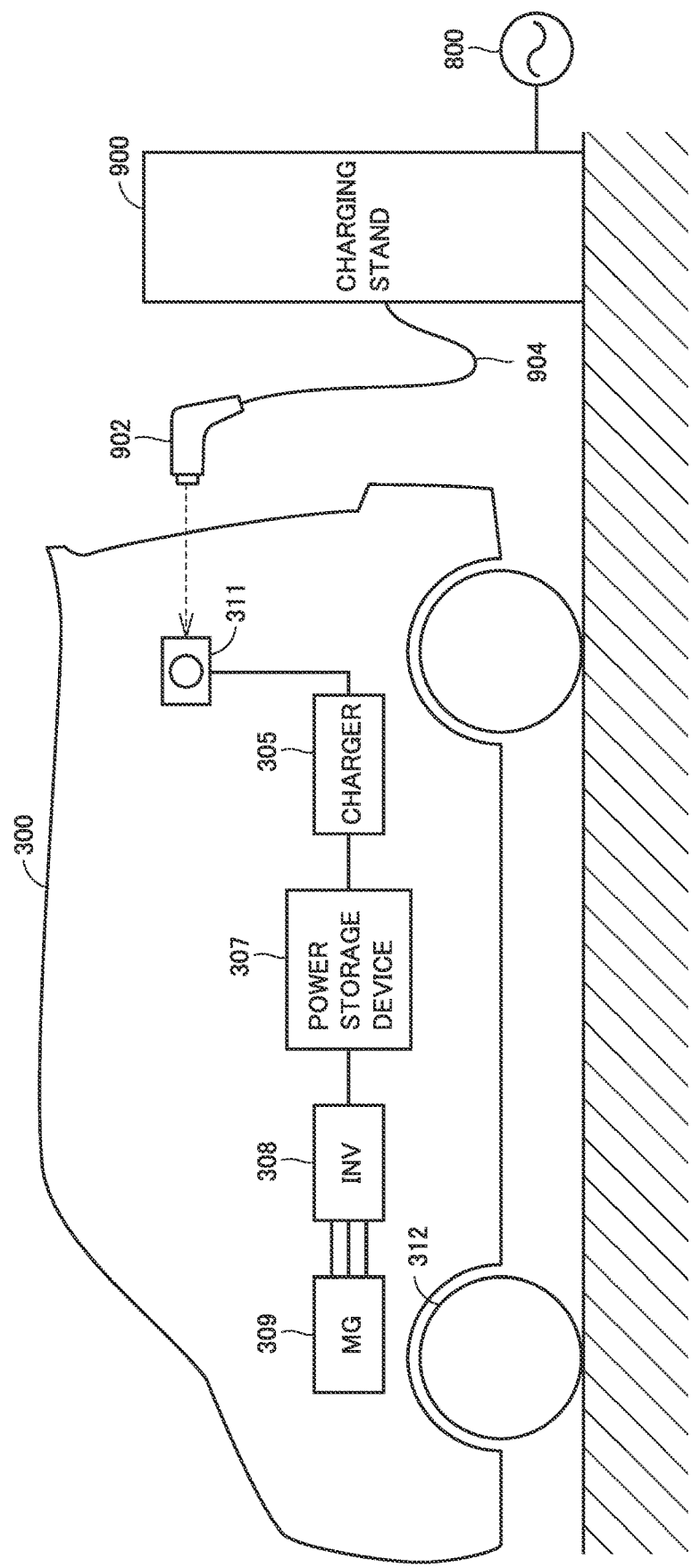
FIG. 2 is a diagram showing an example of a configuration for charging an electric vehicle according to the present embodiment.

FIG. 2 is a diagram showing an example of a configuration for charging an electric vehicle according to the present embodiment. FIG. 2 does not show communication unit 301, controller 303, and the like shown in FIG. 1.

As shown in FIG. 2, vehicle 300 further includes a charger 305, power storage device 307, an inverter 308, a motor generator 309, and an inlet 311.

When a charging stand 900 has a charging connector 902 attached to inlet 311, charger 305 charges power storage device 307 with power supplied from an external power source 800.

Power storage device 307 is configured using, for example, a secondary battery such as a nickel metal hydride battery or a lithium ion battery. Power storage device 307 may be any power storage device capable of storing power, and for example, a large-capacity capacitor may be used instead of power storage device 307.

Inverter 308 is a power conversion device which converts power between AC power and DC power. Inverter 308, for example, converts DC power of power storage device 307 into AC power and supplies it to motor generator 309. Further, inverter 308 receives AC power (regenerative power) from motor generator 309, converts it into DC power, and supplies it to power storage device 307 to electrically charge power storage device 307 therewith.

Motor generator 309 receives power supplied from inverter 308 and provides rotational force to a drive wheel 312. Drive wheel 312 is rotated by the rotational force provided by motor generator 309 to drive vehicle 300.

Inlet 311 is provided to vehicle 300 at an exterior portion of vehicle 300 together with a cover (not shown) such as a lid. Inlet 311 has a shape allowing charging connector 902 to be attached thereto. Inlet 311 and charging connector 902 both have contacts, respectively, incorporated therein, and when charging connector 902 is attached to inlet 311, the contacts come into contact with each other, and inlet 311 and charging connector 902 are thus electrically connected together.

Charging stand 900 is installed outside vehicle 300 and connected to charging connector 902 via charging cable 904. Charging stand 900 is electrically connected to power source 800, and when charging connector 902 is attached to inlet 311, the power of power source 800 is supplied via charging stand 900, charging cable 904, and charging connector 902 to vehicle 300.

Vehicles 310-360 are similar in configuration to vehicle 300. Accordingly, they will not be described redundantly.

Figure 3:
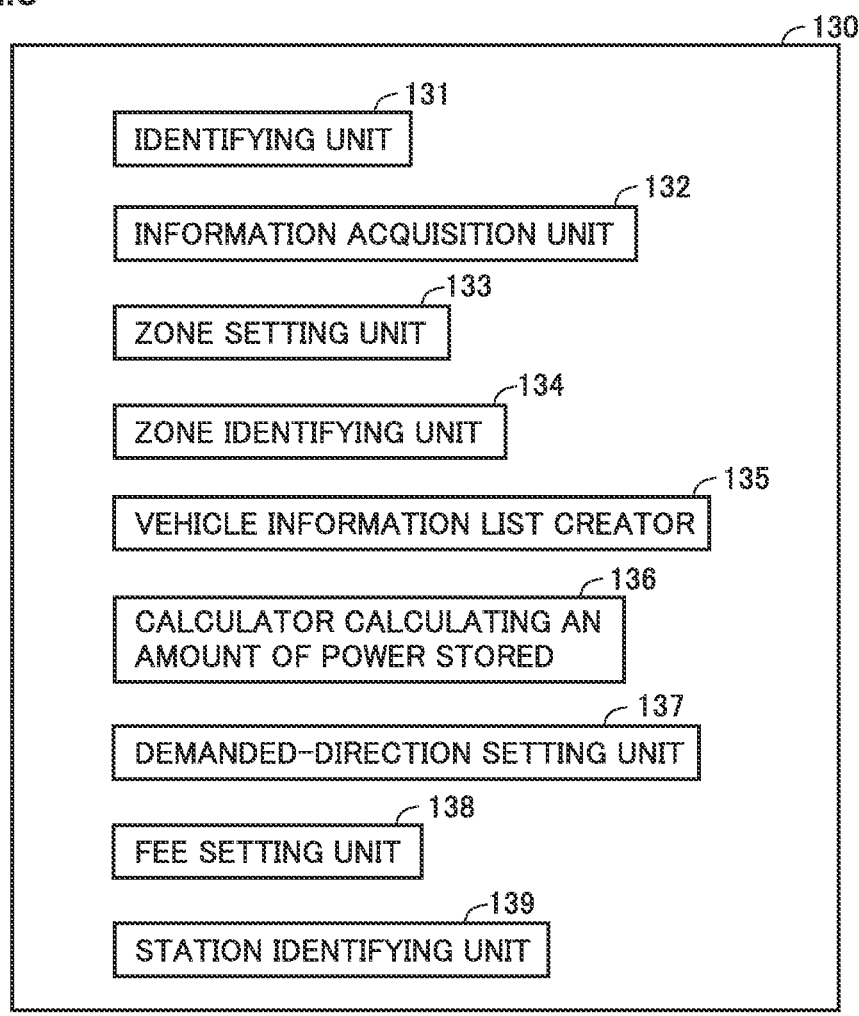
FIG. 3 is a functional block diagram showing a functional configuration of a controller of a fee setting device.

FIG. 3 is a functional block diagram showing a functional configuration of controller 130 of fee setting device 100. Controller 130 includes an identifying unit 131, an information acquisition unit 132, a zone setting unit 133, a zone identifying unit 134, a vehicle information list creator 135, a calculator 136 that calculates an amount of power stored, a demanded-direction setting unit 137, a fee setting unit 138, and a station identifying unit 139.

Identifying unit 131 uses vehicle information received from vehicle 300 to identify vehicle 300 with reference to a vehicle information list 700, which will be described later, stored in storage unit 120. Identifying unit 131 refers to vehicle information list 700 to identify a user who utilizes vehicle 300 identified and is accordingly to be billed. As information for identifying a user, a user ID or the like which is given to the user when the user makes membership registration for car sharing or the like is used. The user ID is obtained from management device 50 that manages the car sharing service, as will be described below, and registered in vehicle information list 700.

Information acquisition unit 132 obtains start-of-utilization information, end-of-utilization information, vehicle information, SOC information, positional information, and the like from vehicle 300 via communication unit 110. Furthermore, information acquisition unit 132 requests vehicle 300 via communication unit 110 to transmit SOC information, positional information and the like. Furthermore, information acquisition unit 132 obtains from management device 50 information about a user, such as a user ID. Note that obtaining the start-of-utilization information and the end-of-utilization information is not limited to doing so from vehicle 300; for example, if management device 50 manages the start-of-utilization information and end-of-utilization information of vehicle 300, they may be obtained from management device 50.

Zone setting unit 133 divides into a plurality of areas a predetermined region including a plurality of locations where vehicle 300 can be rented and returned, and sets each area as a zone. The zone may be set in a method for example as follows: the predetermined region may be divided by a determined numerical area into a lattice to provide areas, which may each be set as a zone, or the predetermined region may be divided from a reference location by a determined distance into concentric circular areas, which may each be set as a zone. The shape of the zone to be set can be any shape such as a quadrilateral or a circle. Furthermore, each zone to be set may have a different shape. Furthermore, when a location where vehicle 300 can be rented and returned is limited to a station or the like, zones may be set by the number of stations included in a single zone. Zone setting unit 133 causes storage unit 120 to store the set zone setting information. Note that zone setting unit 133 sets a zone to include at least one location where a vehicle can be rented and returned.

Referring back to FIG. 1, in this example, an example is shown in which a location where a user can rent and return vehicle 300 is a station. A first zone 500 includes a first station 400 and a second station 410. A second zone 510 includes a third station 420, a fourth station 430, and a fifth station 440. A third zone 520 includes a sixth station 450, a seventh station 460, and communication terminal 200. While FIG. 1 shows an example in which communication terminal 200 is included in third zone 520, communication terminal 200 may be included in another zone or may not be included in any zone.

In first station 400, vehicle 300 and vehicle 310 are parked. In second station 410, vehicle 320 is parked. In third station 420, vehicle 330 is parked. In fourth station 430, vehicle 340 and vehicle 350 are parked. In fifth station 440, no vehicle is parked. In sixth station 450, vehicle 360 is parked. In seventh station 460, no vehicle is parked.

Referring back to FIG. 3, zone identifying unit 134 uses positional information of vehicle 300 obtained by information acquisition unit 132 and the zone setting information set by zone setting unit 133 to identify the zone in which vehicle 300 is currently located.

Station identifying unit 139 uses the positional information of vehicle 300 obtained by information acquisition unit 132 and the positional information of a station read from storage unit 120 to identify the station where vehicle 300 is parked.

Vehicle information list creator 135 creates vehicle information list 700, which will be described later, by using SOC information and positional information obtained by information acquisition unit 132, and information about vehicle 300 such as the zone identified by zone identifying unit 134. Vehicle information list creator 135 updates vehicle information list 700 whenever information about vehicle 300 is updated.

Calculator 136 which calculates an amount of power stored uses vehicle information list 700 to calculate for each zone a sum of SOCs of vehicles parked in that zone (hereinafter also referred to as a "zone SOC"). Calculator 136 which calculates an amount of power stored causes storage unit 120 to store the calculated zone SOC. Note that calculator 136 which calculates an amount of power stored corresponds to a "calculator" according to the present disclosure.

Demanded-direction setting unit 137 sets a demanded direction representing a direction in which movement of vehicle 300 between zones concentrates. Demanded-direction setting unit 137 sets a demanded direction for each zone. The demanded direction may be different depending on, for example, a time zone or a day of the week. Specifically, for a weekday commuting time zone, movement of vehicle 300 concentrates in a direction from a zone located in a residential area to a zone located in the vicinity of a railway station. Accordingly, for the zone located in the residential area, demanded-direction setting unit 137 sets a demanded direction in a direction towards the zone located around the railway station.

The demanded direction is determined from statistics of records of utilization of vehicles by users in the past, reservation statuses of vehicles in real time, and the like.

Fee setting unit 138 sets a utilization fee charged for car-sharing to a user who has utilized vehicle 300. Fee setting unit 138 determines a utilization fee for car-sharing based on an SOC that vehicle 300 has when a user returns vehicle 300, a zone SOC in a zone, and the like. How the utilization fee is set will be described later.

FIG. 4 is a diagram showing an example of a configuration of vehicle information list 700 stored in fee setting device 100. As shown in FIG. 4, in the present embodiment, vehicle information list 700 stores vehicle information, a user ID of a user who uses a vehicle, current SOC information, current positional information, a zone where a vehicle is currently located, and a station where a vehicle is currently located, for each of vehicles 300-360.

These pieces of information are updated whenever fee setting device 100 periodically receives SOC information and positional information from vehicles 300 to 360. Furthermore, these pieces of information are also updated when information acquisition unit 132 of fee setting device 100 requests and obtains the SOC information and positional information of vehicles 300 to 360. Further, these pieces of information are also updated when vehicles 300-360 are shifted from the READY-ON state to the READY-OFF state and fee setting device 100 receives SOC information and positional information from vehicles 300-360.

(Method for Setting a Fee)

In car-sharing using such a sharing system as described above, a user may return a vehicle at a location different from that at which the user has rented the vehicle. This may cause an uneven distribution between vehicle renting locations in how many vehicles are rentably parked in each location.

Furthermore, when using an electric vehicle for car sharing, it is necessary to consider the SOC of the power storage device of the electric vehicle present in a vehicle renting location. An electric vehicle requires a longer period of time when the electric vehicle is replenished with driving energy than a conventional gasoline-powered vehicle driven by an internal combustion engine to run. Therefore, even if a considerable number of electric vehicles are parked in a vehicle renting location, there is a possibility that the electric vehicles are still electrically insufficiently charged and thus have a small amount of power stored therein, and a user may not be able to immediately utilize an electric vehicle.

Accordingly, there is a demand in sharing an electric vehicle for a fee setting system in which an uneven distribution between the number of vehicles in a vehicle renting location and the number of vehicles in another vehicle renting location and an uneven distribution between an amount of power stored in vehicles in a vehicle renting location and an amount of power stored in vehicles in another vehicle renting location can be spontaneously leveled to allow vehicles to be utilized more efficiently.

In the present embodiment, a predetermined region including a plurality of locations where vehicles can be rented and returned is divided into a plurality of zones. A utilization fee for car sharing is discounted depending on how a user utilizes vehicle 300 between zones. This encourages the user to use the vehicle in a manner which levels an uneven distribution between the number of vehicles in a vehicle renting location and the number of vehicles in another vehicle renting location and an uneven distribution between an amount of power stored in vehicles in a vehicle renting location and an amount of power stored in vehicles in another vehicle renting location. As a result, an uneven distribution between the number of vehicles in a vehicle renting location and the number of vehicles in another vehicle renting location and an uneven distribution between an amount of power stored in vehicles in a vehicle renting location and an amount of power stored in vehicles in another vehicle renting location can be leveled and the vehicles can be utilized more efficiently.

In the present embodiment, for a system of discounting a utilization fee for car sharing, two types of discounts, i.e., a discount for leveling and a discount for vehicle allocation, are set. The discount for leveling is a discount for leveling an uneven distribution in zone SOC between zones. The discount for vehicle allocation is a discount for leveling an uneven distribution between the number of vehicles rentably parked in a zone and the number of vehicles rentably parked in another zone.

In the present embodiment, the discount for leveling is applied when a user who has rented vehicle 300 at a zone moves to a zone having a smaller zone SOC than the zone where the user has rented vehicle 300 and the user moves in a direction different from a demanded direction. This promotes a movement that is from a zone where vehicle 300 is rented to a zone having a smaller zone SOC and that is in a direction different from a demanded direction, and can thus level an uneven distribution caused between a zone SOC of a zone and that of another zone.

Furthermore, in the present embodiment, a discount rate applied to a discount for leveling is determined using an SOC that vehicle 300 has when the user of the vehicle returns the vehicle. A large discount rate is set when the user returns vehicle 300 with an SOC of a reference value or more remaining therein. This encourages the user to return vehicle 300 with an SOC of the reference value or more remaining therein. This allows the returned vehicle 300 to be electrically charged in a reduced period of time and hence utilized more efficiently.

In the present embodiment, the discount for vehicle allocation is applied when a zone where vehicle 300 is returned has a total number of vehicles less than or equal to a prescribed number X. Thus, an uneven distribution between the number of vehicles rentably parked in a zone and the number of vehicles rentably parked in another zone can also be resolved.

Figure 5:
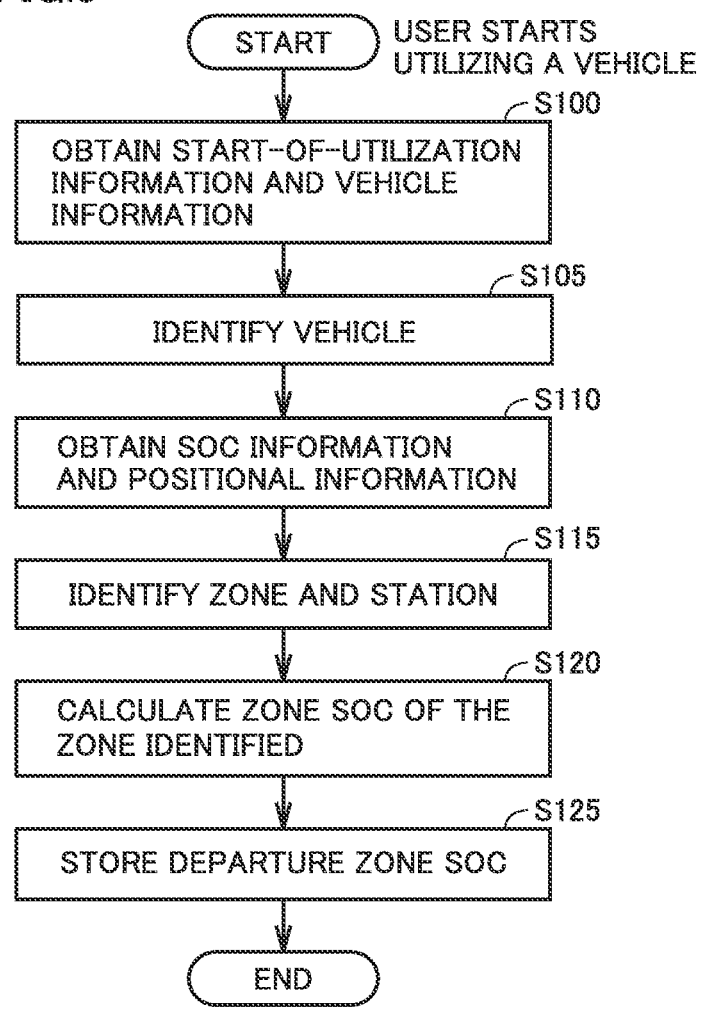
FIG. 5 is a flowchart showing a process performed by the fee setting device in the sharing system according to the present embodiment when utilizing a vehicle is started.

Sharing system 1 in the car sharing of the present embodiment will more specifically be described below. FIG. 5 is a flowchart showing a process performed by fee setting device 100 in sharing system 1 according to the present embodiment when utilizing vehicle 300 is started. This process is performed whenever a user starts utilizing vehicle 300. Hereinafter, an example in which a user uses vehicle 300 will be described. While each step shown in the flowchart shown in FIG. 5 is implemented by software processing done by fee setting device 100, a part thereof may be implemented by hardware (or electric circuitry) fabricated in fee setting device 100.

Figure 6:
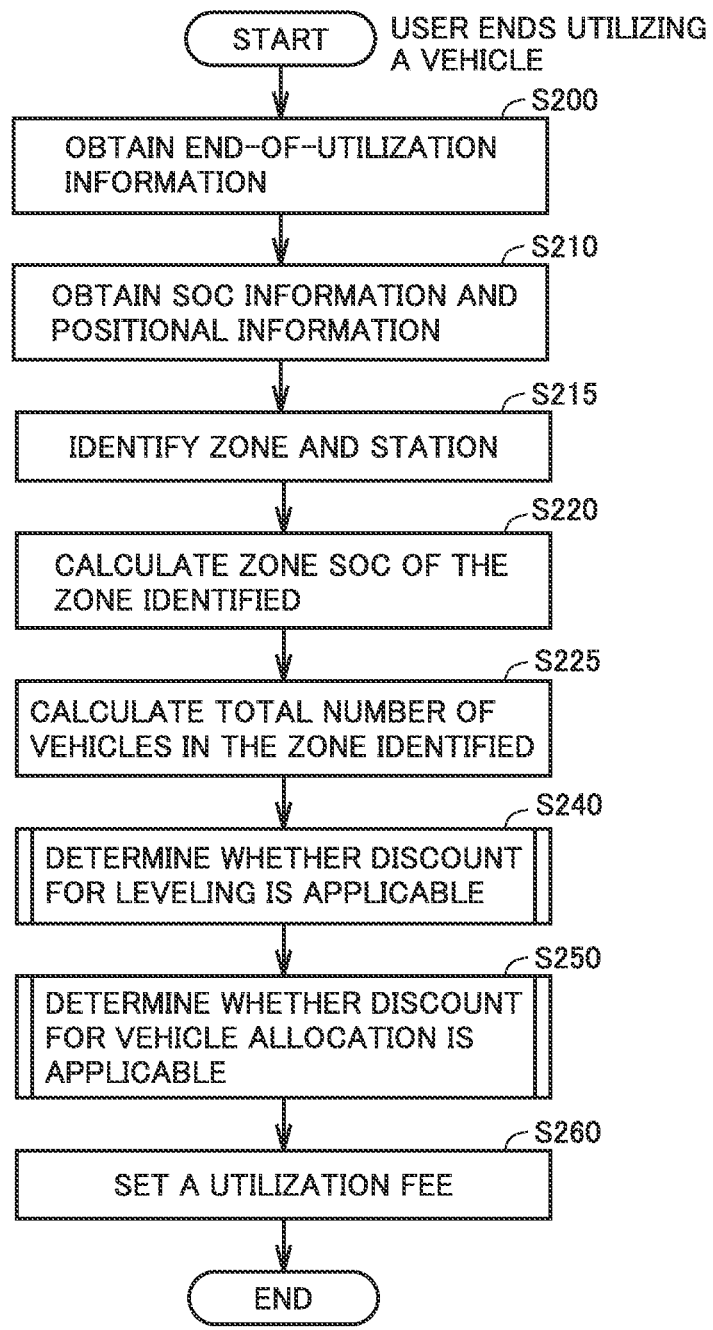
FIG. 6 is a flowchart showing a process performed by the fee setting device in the sharing system according to the present embodiment when utilizing a vehicle ends.

Each step shown in the flowcharts shown in FIG. 6 is similarly discussed.

When a user starts utilizing vehicle 300, e.g., when vehicle 300 shifts from the READY-OFF state to the READY-ON state, controller 130 obtains start-of-utilization information and vehicle information from vehicle 300 (step (S) 100).

Controller 130 uses the obtained vehicle information to identify vehicle 300 that the user has started to utilize (S105).

Controller 130 obtains vehicle 300's SOC information and positional information (S110). Controller 130 updates the SOC information and positional information of vehicle information list 700 and uses the obtained positional information and the zone setting information read from storage unit 120 to identify the zone to which vehicle 300 belongs (S115). In S115, the zone to which vehicle 300 belongs may be a zone stored in vehicle information list 700 where the immediately previous utilization of the vehicle ended. When a zone where the immediately previous utilization of the vehicle ended is stored in the list, controller 130 in S110 may not obtain the positional information.

Further, controller 130 uses the obtained positional information and the positional information of a station read from storage unit 120 to identify the station where vehicle 300 is parked (S115). Controller 130 updates information stored in vehicle information list 700 at an SOC column, a zone column and a station column.

Using vehicle information list 700, controller 130 calculates a zone SOC of the zone to which vehicle 300 belongs (S120). In the following, the zone SOC calculated in S120 will also be referred to as a "departure zone SOC." Note that a departure zone SOC corresponds to a "first amount" according to the present disclosure. Controller 130 causes storage unit 120 to store a departure zone SOC that vehicle 300 has when its utilization is started (S125).

FIG. 6 is a flowchart showing a process performed by fee setting device 100 in sharing system 1 according to the present embodiment when utilizing vehicle 300 ends. This process is performed whenever a user ends utilizing vehicle 300.

When the user ends utilizing vehicle 300, e.g., when vehicle 300 shifts from the READY-ON state to the READY-OFF state, controller 130 obtains end-of-utilization information from vehicle 300 (S200). Controller 130 updates a status-of-use field (not shown) of vehicle 300 in vehicle information list 700. For example, controller 130 updates vehicle 300's status of use from "in use" to "parked" or "currently electrically charged."

Controller 130 obtains vehicle 300's SOC information and positional information (S210). Controller 130 updates the SOC information and positional information of vehicle information list 700 and uses the obtained positional information and the zone setting information read from storage unit 120 to identify the zone in which vehicle 300 is parked (S215). Further, controller 130 uses the obtained positional information and the positional information of a station read from storage unit 120 to identify the station to which vehicle 300 belongs (S215). Controller 130 updates information stored in vehicle information list 700 at the SOC column, the zone column and the station column.

Using vehicle information list 700, controller 130 calculates a zone SOC of the zone to which vehicle 300 belongs (S220). In the following, the zone SOC calculated in S220 will also be referred to as a "return zone SOC." Note that a return zone SOC corresponds to a "second amount" according to the present disclosure.

Using vehicle information list 700, controller 130 calculates a total number of vehicles parked in the zone to which vehicle 300 belongs (S225).

Controller 130 determines whether the discount for leveling is applicable (S240). Whether the discount for leveling is applicable is determined, as will more specifically be described later.

Controller 130 determines whether the discount for vehicle allocation is applicable (S250). Whether the discount for vehicle allocation is applicable is determined, as will more specifically be described later.

Controller 130 sets a utilization fee (S260).

Figure 7:
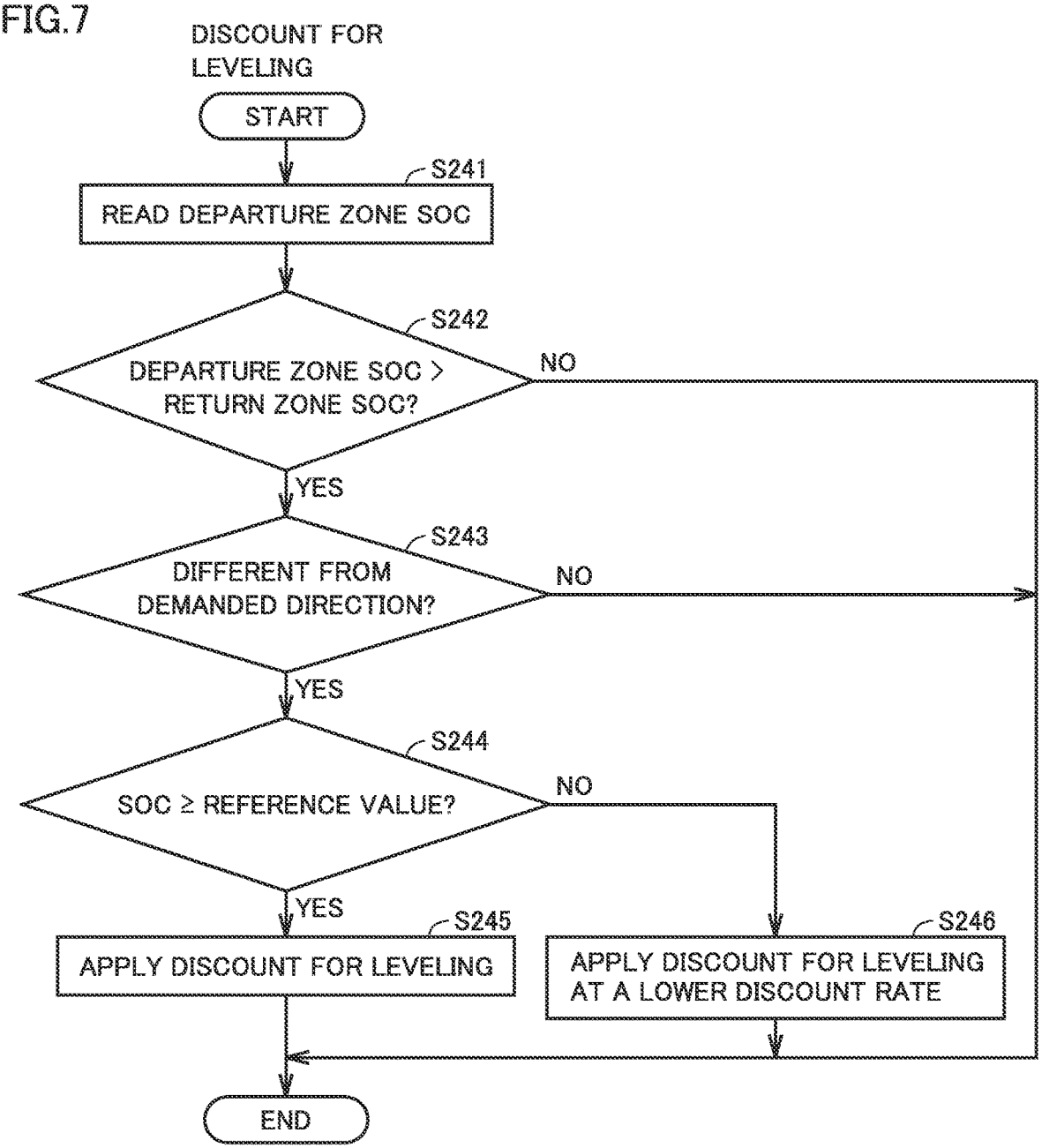
FIG. 7 is a flowchart showing a process performed by the fee setting device according to the present embodiment in determining whether to apply a discount for leveling.

FIG. 7 is a flowchart showing a process performed by fee setting device 100 according to the present embodiment in determining whether to apply a discount for leveling.

Controller 130 reads the departure zone SOC from storage unit 120 (S241). Controller 130 compares the departure zone SOC with the return zone SOC (S242).

If the departure zone SOC is less than or equal to the return zone SOC (NO in S242), controller 130 does not apply the discount for leveling. This is because in that case vehicle 300 did not move in a direction to level zone SOCs between zones.

If the departure zone SOC is larger than the return zone SOC (YES in S242), controller 130 proceeds to S243.

Controller 130 compares the direction in which vehicle 300 has moved, that is, the direction from the zone where vehicle 300 is rented toward the zone where vehicle 300 is returned, with a demanded direction currently set (S243). If the direction in which vehicle 300 has moved is the same direction as the demanded direction (NO in S243), controller 130 does not apply the discount for leveling. This is because the vehicle did not move in a direction to disperse movements made in a direction in which vehicles' movements concentrate.

If the direction in which vehicle 300 has moved is different from the demanded direction (YES in S243), controller 130 proceeds to S244.

Controller 130 determines whether an SOC that vehicle 300 has when it is returned is equal to or larger than the reference value (S244). If the SOC is equal to or larger than the reference value (YES in S244), controller 130 applies the discount for leveling (S245). This is because vehicle 300 returned with an SOC equal to or larger than the reference value can be electrically charged in a reduced period of time and hence utilized more efficiently. The reference value is set, for example, to a value allowing the returned vehicle 300 to be immediately used by a next user to move a short or medium distance.

When the SOC is smaller than the reference value (NO in S244), controller 130 applies a discount for leveling at a lower discount rate than when the SOC is equal to or larger than the reference value (S246). This is because vehicle 300 returned with an SOC smaller than the reference value requires time for charging power storage device 307, and is thus used less efficiently than when vehicle 300 is returned with an SOC equal to or larger than the reference value. Note that when the SOC is smaller than the reference value, controller 130 may not apply the discount for leveling.

Figure 8:
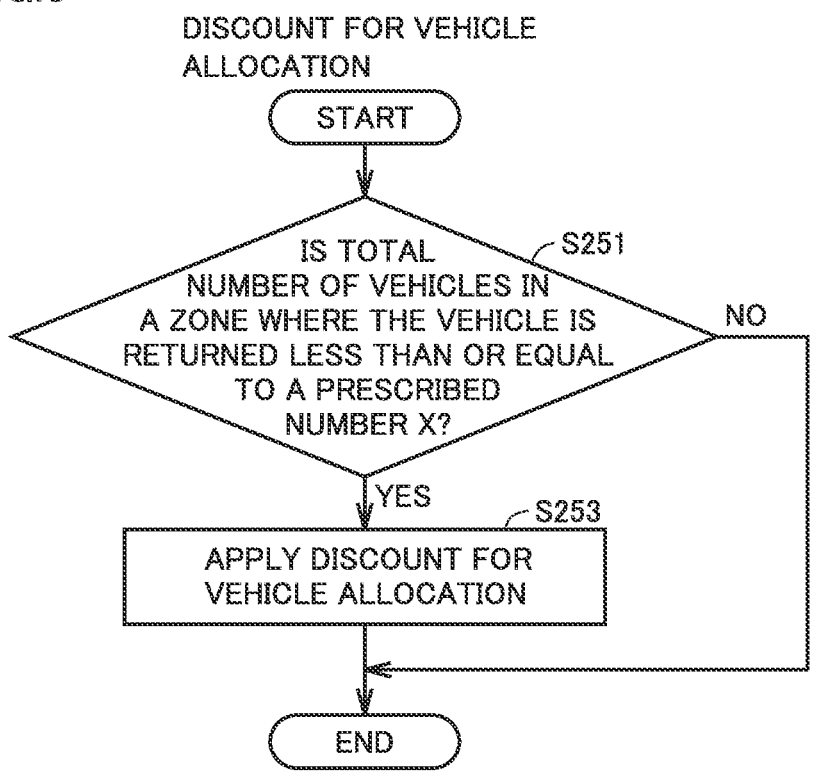
FIG. 8 is a flowchart showing a process performed by the fee setting device according to the present embodiment in determining whether to apply a discount for vehicle allocation.

FIG. 8 is a flowchart showing a process performed by fee setting device 100 according to the present embodiment in determining whether to apply the discount for vehicle allocation.

Controller 130 determines whether the total number of vehicles parked in the zone as calculated in S225 of FIG. 6 is less than or equal to the prescribed number X (S251). If the total number of vehicles in the zone is less than or equal to the prescribed number X (YES in S251), controller 130 applies the discount for vehicle allocation (S253). This is because the vehicle has moved in a direction to resolve an uneven distribution between a total number of vehicles rentably parked in a zone and a total number of vehicles rentably parked in another zone.

If the total number of vehicles parked in the zone is larger than the prescribed number X (NO in S251), controller 130 does not apply the discount for vehicle allocation. This is because the vehicle has not moved in a direction to resolve an uneven distribution between a total number of vehicles rentably parked in a zone and a total number of vehicles rentably parked in another zone. It should be noted that the prescribed number X may be set for each zone based on statistics of records of utilization of vehicles by users in the past, or may be set uniformly.

EXAMPLES

Figure 9:
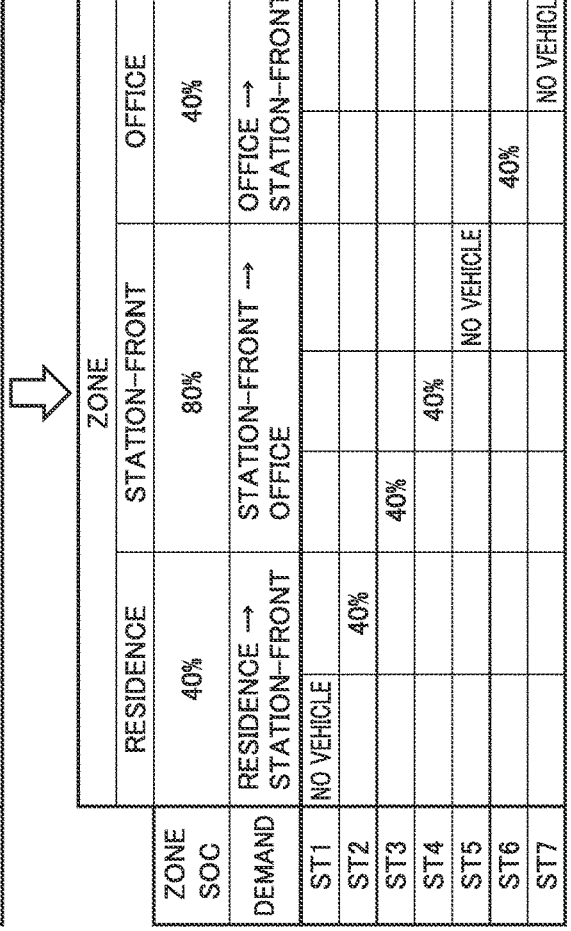
FIG. 9 is a diagram (part 1) for illustrating an example with the configuration of the present embodiment applied thereto.
Figure 10:
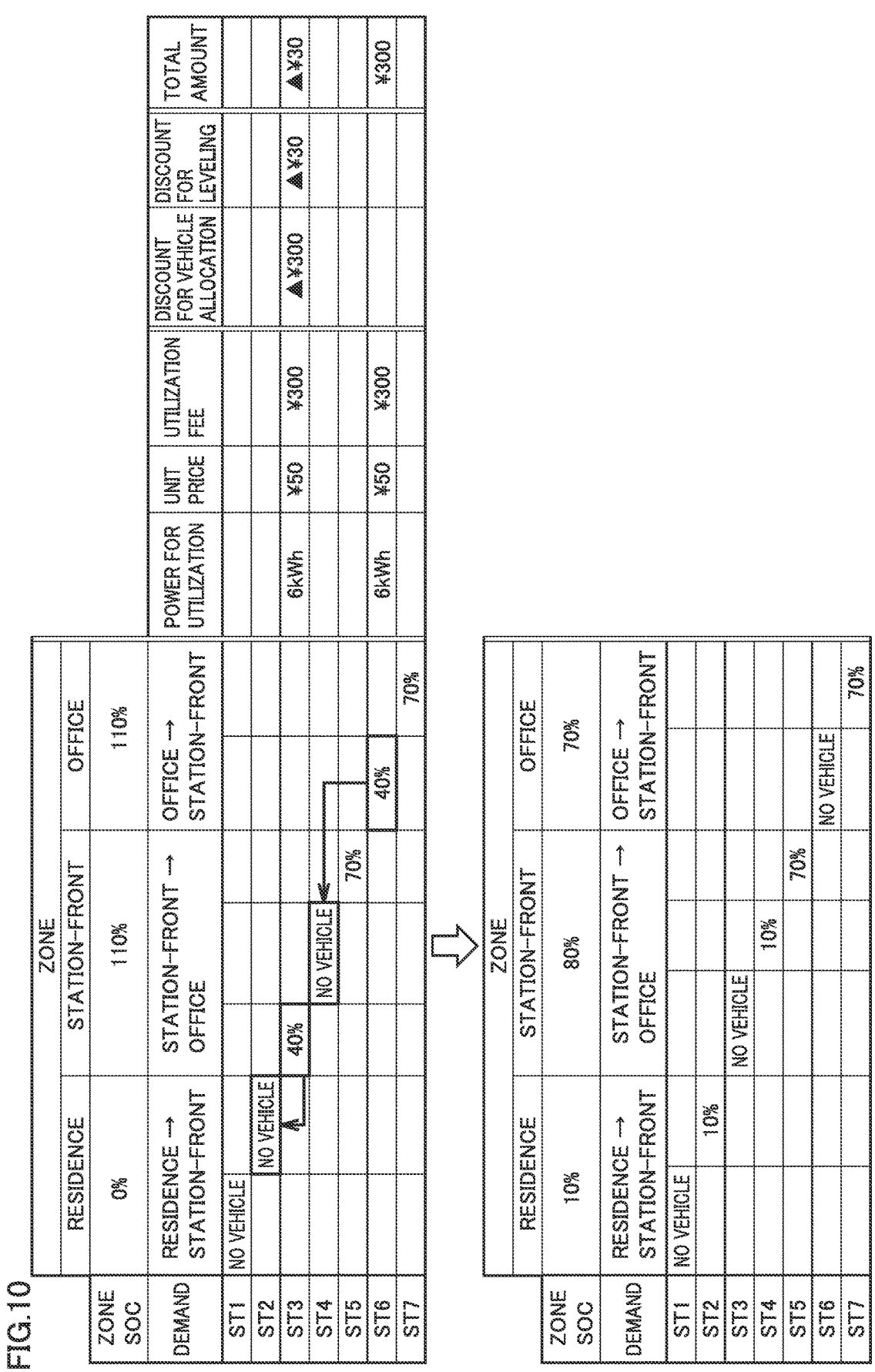
FIG. 10 is a diagram (part 2) for illustrating an example with the configuration of the present embodiment applied thereto.

Hereinafter, the present embodiment will be described using an example. FIG. 9 is a diagram for illustrating an example with the configuration of the present embodiment applied thereto. In FIG. 9, a station is denoted as "ST." In the following description, in order to simplify explanation, it is assumed that all vehicles have mounted therein power storage devices, respectively, of substantially the same power storage capacity and substantially the same state of degradation. Furthermore, it is assumed that power for utilization that is required to travel between stations is uniformly 6 kWh and a unit price of power is 50 yen. It is assumed that power used for movement between stations is an SOC of 30%. FIG. 10 is similarly discussed. Note that while, based on the above premise, in the following description, a zone SOC is calculated by adding stations' SOCs together for the sake of simplicity, an average value in SOC in a zone may be calculated.

A discount rate applied to the discount for leveling is set to 100% of a utilization fee when a vehicle is returned to a station with an SOC of 30% or more remaining, and 10% of the utilization fee of the power for utilization when the vehicle is returned to the station with an SOC of less than 30% remaining, for the sake of illustration. In FIG. 7, the reference value is 30%.

Further, the discount for vehicle allocation is applied when vehicle 300 is returned to a zone having no vehicle for the sake of illustration. A discount rate applied to the discount for vehicle allocation is 100% of the utilization fee for the sake of illustration. That is, in FIG. 8, the prescribed number X is 0.

In an upper diagram in FIG. 9, first station 400 and second station 410 are included in a residential zone (or the first zone) 500. In FIG. 9, first station 400 is represented as "ST1." The second to seventh stations are similarly represented. Furthermore, FIG. 10 is also similarly described. Third station 420, fourth station 430, and fifth station 440 are included in a station-front zone (the second zone) 510. Sixth station 450 and seventh station 460 are included in an office zone (the third zone) 520.

In the upper diagram in FIG. 9, for each station, an SOC of a vehicle parked therein or "no vehicle" is indicated. "No vehicle" indicates that no available vehicle is parked. That is, the SOC of a station with an indication of "no vehicle" is 0%. For third station 420, an SOC of 40% is indicated. This indicates that a vehicle with an SOC of 40% is parked in third station 420. For the sake of simplicity, one or no vehicle is parked in each station for the sake of illustration. That is, a vehicle with an SOC of 40% is alone parked in third station 420.

In residential zone 500, both first station 400 and second station 410 indicate "no vehicle." Hence, the zone SOC of residential zone 500 is 0%. For residential zone 500, a demanded direction from residential zone 500 toward station-front zone 510 is set.

In station-front zone 510, third station 420 indicates 40%, fourth station 430 indicates no vehicle, and fifth station 440 indicates 70%. Hence, station-front zone 510 has a zone SOC of 110%. For station-front zone 510, a demanded direction from station-front zone 510 toward office zone 520 is set.

In office zone 520, sixth station 450 indicates 40% and seventh station 460 indicates 70%. Hence, office zone 520 has a zone SOC of 110%. For office zone 520, a demanded direction from office zone 520 toward station-front zone 510 is set.

In the upper diagram in FIG. 9, an example is indicated in which a user moves from seventh station 460 to fourth station 430 and another user moves from fifth station 440 to second station 410.

For the movement from seventh station 460 to fourth station 430, a utilization fee is calculated as 300 yen from a power of 6 kWh for utilization and a unit price of power of 50 yen. Initially, whether the discount for leveling is applicable will be considered. The movement from seventh station 460 to fourth station 430 is a movement from office zone 520 to station-front zone 510. Since the zone SOC of office zone 520 is 110% and the zone SOC of station-front zone 510 is 110%, the movement is not a movement from a zone with a high zone SOC to a zone with a low zone SOC. Accordingly, the discount for leveling is not applied.

Whether the discount for vehicle allocation is applicable will now be considered. In station-front zone 510, available vehicles are present at third station 420 and fifth station 440. Accordingly, the discount for vehicle allocation is not applied. Thus, the utilization fee for the movement from seventh station 460 to fourth station 430 will be 300 yen.

For the movement from fifth station 440 to second station 410, a utilization fee is calculated as 300 yen from a power of 6 kWh for utilization and a unit price of power of 50 yen. Whether the discount for leveling is applicable is considered. The movement from fifth station 440 to second station 410 is a movement from station-front zone 510 to residential zone 500. Since the zone SOC of station-front zone 510 is 110% and the zone SOC of residential zone 500 is 0%, the movement is a movement from a zone with a high zone SOC to a zone with a low zone SOC. Since the demanded direction is set in the direction from station-front zone 510 to office zone 520, the movement from station-front zone 510 to residential zone 500 is a movement in a direction different from the demanded direction. Accordingly, the discount for leveling is applied. When the user returns vehicle 300 at second station 410, the SOC of vehicle 300 is 40% (70%−30%=40%). Accordingly, by the discount for leveling, 100% of the utilization fee is discounted.

Whether the discount for vehicle allocation is applicable will now be considered. In residential zone 500, there is no vehicle available. In other words, the number of vehicles in residential zone 500 to which vehicle 300 is returned is less than or equal to the prescribed number X, and accordingly, the discount for vehicle allocation is applied and 100% of the utilization fee is discounted. Thus, the utilization fee for the movement from fifth station 440 to second station 410 is minus 300 yen. In that case, the minus 300 yen may discounted from a utilization fee for a next utilization or may be provided to the user in the form of points that the user can appropriate for a utilization fee.

The lower diagram in FIG. 9 shows a distribution of a zone SOC in each zone after a user moved. Residential 500, station-front zone 510 and office zone 520 have zone SOCs of 40%, 80%, and 40%, respectively, and, when compared with the upper diagram in FIG. 9, it can be seen that the zones have their zone SOCs leveled. Thus, when there is a user who receives a large discount, the zones have their zone SOCs leveled.

FIG. 10 is a diagram for illustrating an example with the configuration of the present embodiment applied thereto. In the upper diagram in FIG. 10, each zone's initial SOC, each station's initial SOC, and each zone's demanded direction are the same as in the case of FIG. 9. In FIG. 10, an example is shown in which a user moves from sixth station 450 to fourth station 430 and another user moves from third station 420 to second station 410.

For the movement from sixth station 450 to fourth station 430, a utilization fee is calculated as 300 yen from a power of 6 kWh for utilization and a unit price of power of 50 yen. Initially, whether the discount for leveling is applicable will be considered. The movement from sixth station 450 to fourth station 430 is a movement from office zone 520 to station-front zone 510. Since the zone SOC of office zone 520 is 110% and the zone SOC of station-front zone 510 is 110%, the movement is not a movement from a zone with a high zone SOC to a zone with a low zone SOC. Accordingly, the discount for leveling is not applied.

Whether the discount for vehicle allocation is applicable will now be considered. In station-front zone 510, there are available vehicles present at third station 420 and fifth station 440. Accordingly, the discount for vehicle allocation is not applied. Thus, the utilization fee for the movement from sixth station 450 to fourth station 430 will be 300 yen.

For the movement from third station 420 to second station 410, a utilization fee is calculated as 300 yen from a power of 6 kWh for utilization and a unit price of power of 50 yen. Initially, whether the discount for leveling is applicable will be considered. The movement from third station 420 to second station 410 is a movement from station-front zone 510 to residential zone 500. Since the zone SOC of station-front zone 510 is 110% and the zone SOC of residential zone 500 is 0%, the movement is a movement from a zone with a high zone SOC to a zone with a low zone SOC. Since the demanded direction is set in the direction from station-front zone 510 to office zone 520, the movement from station-front zone 510 to residential zone 500 is a movement in a direction different from the demanded direction. Accordingly, the discount for leveling is applied. When the user returns vehicle 300 at second station 410, the SOC of vehicle 300 is 10% (40%−30%=10%). Accordingly, by the discount for leveling, 10% of the utilization fee is discounted.

Whether the discount for vehicle allocation is applicable will now be considered. In residential zone 500, there is no vehicle available. In other words, the number of vehicles in residential zone 500 to which vehicle 300 is returned is less than or equal to the prescribed number X, and accordingly, the discount for vehicle allocation is applied and 100% of the utilization fee is discounted. Thus, the utilization fee for the movement from fifth station 440 to second station 410 is minus 30 yen.

The lower diagram in FIG. 10 shows a distribution of zone SOC in each zone after a user moved. Residential zone 500, station-front zone 510 and office zone 520 have zone SOCs of 10%, 80%, and 70%, respectively, and, when compared with the upper diagram in FIG. 10, the zones have their zone SOCs leveled, although not as compared with the lower diagram in FIG. 9. Thus the discount for leveling and the discount for vehicle allocation are set to provide a larger discount rate for a movement in a direction which promotes more leveling.

By controlling fee setting device 100 and vehicle 300 according to the above processing, a utilization fee for car sharing to which a discount for leveling is applied is set for a user when the user returns vehicle 300 at a zone having a smaller zone SOC than the zone where the user has rented vehicle 300 and vehicle 300 also moves in a direction different from a demanded direction. An SOC that vehicle 300 has when vehicle 300 is returned is used to determine a discount rate applied to the discount for leveling. This promotes a movement that is from a zone where vehicle 300 is rented to a zone having a smaller zone SOC and that is in a direction different from a demanded direction, and can thus level an uneven distribution caused between a zone SOC of a zone and that of another zone. And setting a large discount rate when vehicle 300 is returned with an SOC of a reference value or more remaining therein promotes returning vehicle 300 with an SOC of the reference value or more remaining therein. This allows the returned vehicle 300 to have power storage device 307 electrically charged in a reduced period of time, and hence be utilized more efficiently.

Furthermore, the discount for vehicle allocation is applied to the user when the user returns vehicle 300 at a zone having a total number of vehicles less than or equal to the prescribed number X. This can resolve an uneven distribution between the number of vehicles rentably parked in a zone and the number of vehicles rentably parked in another zone.

While in the present embodiment, two discounts, i.e., a discount for leveling and a discount for vehicle allocation, are applied, being capable of leveling an uneven distribution between an amount of power stored in a zone and an amount of power stored in another zone suffices. The discount for vehicle allocation may not be applied and the discount for leveling may alone be applied.

Furthermore, while in the present embodiment the discount for leveling is applied to a user when the user returns vehicle 300 at a zone having a smaller zone SOC than the zone where the user has rented vehicle 300 and vehicle 300 also moves in a direction different from a demanded direction, being capable of leveling an uneven distribution between an amount of power stored in a zone and an amount of power stored in another zone suffices. An extra fee may be set when a departure zone SOC is less than or equal to a return zone SOC and/or when vehicle 300 moves in the same direction as the demanded direction.

While in the present embodiment the discount for leveling and the discount for vehicle allocation are applied with reference to vehicle 300's SOC and a zone SOC, they may be applied with reference to an amount power stored in each vehicle and a sum of amounts of power stored in each vehicle in each zone.

Furthermore, while in the present embodiment a sum of SOCs of vehicles parked in each zone (i.e., a zone SOC) is calculated and a departure zone SOC and a return zone SOC are compared, an average value of SOCs of vehicles parked in a zone may alternatively be used. Doing so is effective for example when the number of stations included in a zone is significantly differs from the number of stations included in another zone. Using an average value of SOCs of vehicles parked in a zone can promote a movement from a zone with a large average value of SOC to a zone with a small average value of SOC.

Further, while in the present embodiment an example has been described in which a station has been described as a location where vehicle 300 is rented and returned, any location where vehicle 300 can be rented and returned suffices. For example, if a setting is done to allow vehicle 300 to be dropped off at any location on a shoulder of a road, a location where vehicle 300 is rented and returned includes the shoulder of the road on which vehicle 300 is allowed to be dropped off <First Modification>

In the above embodiment a relationship between a departure zone SOC and a return zone SOC is determined, a relationship between a direction in which a user moves and a demanded direction is determined, and an SOC that a vehicle has when it is returned is determined to thus determine whether a discount for leveling is applicable, and a discount rate. The relationship between the departure zone SOC and the return zone SOC may alone be determined to determine whether the discount for leveling is applicable, and the discount rate. In a first modification, an example will be described in which, for whether the discount for leveling is applicable, the relationship between the departure zone SOC and the return zone SOC is alone determined to determine whether the discount for leveling is applicable, and the discount rate.

FIG. 11 is a flowchart showing a process performed by fee setting device 100 according to the first modification in determining whether to apply a discount for leveling. Sharing system 1 according to the first modification is similar in configuration to the above embodiment, and accordingly, will not be described repeatedly.

Controller 130 reads the departure zone SOC from storage unit 120 (S241A). Controller 130 compares the departure zone SOC with the return zone SOC (S242A).

If the departure zone SOC is less than or equal to the return zone SOC (NO in S242A), controller 130 does not apply the discount for leveling. If the departure zone SOC is larger than the return zone SOC (YES in S242A), controller 130 applies the discount for leveling (S245A).

Note that controller 130 may determine a discount rate applied to the discount for leveling depending on a difference in magnitude between the departure zone SOC and the return zone SOC.

Furthermore, when the departure zone SOC is less than or equal to the return zone SOC, controller 130 may apply the discount for leveling at a discount rate smaller than when the departure zone SOC is larger than the return zone SOC. In that case, controller 130 may determine the discount rate applied to the discount for leveling depending on a difference in magnitude between the departure zone SOC and the return zone SOC.

This promotes a movement that is from a zone where vehicle 300 is rented to a zone having a smaller zone SOC, and can thus level an uneven distribution caused between a zone SOC of a zone and that of another zone.

While in the first modification the discount for leveling is applied when a departure zone SOC is larger than a return zone SOC, being capable of leveling an uneven distribution caused between a zone SOC of a zone and that of another zone suffices. An extra fee may be set when the departure zone SOC is less than or equal to the return zone SOC.

<Second Modification>

In the above embodiment a relationship between a departure zone SOC and a return zone SOC is determined, a relationship between a direction in which a user moves and a demanded direction is determined, and an SOC that a vehicle has when it is returned is determined to thus determine whether a discount for leveling is applicable, and a discount rate. The relationship between the departure zone SOC and the return zone SOC and the relationship with the demanded direction may be determined to determine whether the discount for leveling is applicable, and the discount rate. In a second modification, an example will be described in which, for whether the discount for leveling is applicable, the relationship between the departure zone SOC and the return zone SOC and the relationship with the demanded direction are determined to determine whether the discount for leveling is applicable, and the discount rate.

FIG. 12 is a flowchart showing a process performed by fee setting device 100 according to the second modification in determining whether to apply a discount for leveling. Sharing system 1 according to the second modification is similar in configuration to the above embodiment, and accordingly, will not be described repeatedly.

Controller 130 reads the departure zone SOC from storage unit 120 (S241B). Controller 130 compares the departure zone SOC with the return zone SOC (S242B). If the departure zone SOC is less than or equal to the return zone SOC (NO in S242B), controller 130 does not apply the discount for leveling. If the departure zone SOC is larger than the return zone SOC (YES in S242B), controller 130 proceeds to S243B.

Controller 130 compares the direction in which vehicle 300 moves with the demanded direction (S243B). If the direction in which vehicle 300 moves is the same direction as the demanded direction (NO in S243B), controller 130 does not apply the discount for leveling. If the direction in which vehicle 300 moves is a direction different from the demanded direction (YES in S243B), controller 130 applies the discount for leveling (S245B).

Note that controller 130 in S245B may determine a discount rate applied to the discount for leveling depending on a difference in magnitude between the departure zone SOC and the return zone SOC.

Furthermore, when the departure zone SOC is less than or equal to the return zone SOC and/or when vehicle 300 moves in the same direction as the demanded direction, controller 130 may apply the discount for leveling at a smaller discount rate than when the departure zone SOC is larger than the return zone SOC and vehicle 300 also moves in a direction different from the demanded direction. In that case, controller 130 may determine the discount rate applied to the discount for leveling depending on a difference in magnitude between the departure zone SOC and the return zone SOC.

This promotes a movement that is from a zone where vehicle 300 is rented to a zone having a smaller zone SOC and that is in a direction different from a demanded direction, and can thus level an uneven distribution caused between a zone SOC of a zone and that of another zone.

While in the second modification the discount for leveling is applied when a departure zone SOC is larger than a return zone SOC and vehicle 300 also moves in a direction different from a demanded direction, being capable of leveling an uneven distribution caused between a zone SOC of a zone and that of another zone suffices. An extra fee may be set when the departure zone SOC is less than or equal to the return zone SOC and/or when vehicle 300 moves in the same direction as the demanded direction.

<Third Modification>

In the above embodiment a relationship between a departure zone SOC and a return zone SOC is determined, a relationship between a direction in which a user moves and a demanded direction is determined, and an SOC that a vehicle has when it is returned is determined to thus determine whether a discount for leveling is applicable, and a discount rate. The relationship between the departure zone SOC and the return zone SOC and the SOC that the vehicle has when it is returned may be determined to determine whether the discount for leveling is applicable, and the discount rate. In a third modification, an example will be described in which, for whether the discount for leveling is applicable, the relationship between the departure zone SOC and the return zone SOC and the SOC that the vehicle has when it is returned are determined to determine whether the discount for leveling is applicable, and the discount rate.

FIG. 13 is a flowchart showing a process performed by fee setting device 100 according to the third modification in determining whether to apply a discount for leveling. Sharing system 1 according to the third modification is similar in configuration to the above embodiment, and accordingly, will not be described repeatedly.

Controller 130 reads the departure zone SOC from storage unit 120 (S241C). Controller 130 compares the departure zone SOC with the return zone SOC (S242C). If the departure zone SOC is less than or equal to the return zone SOC (NO in S242C), controller 130 does not apply the discount for leveling. If the departure zone SOC is larger than the return zone SOC (YES in S242C), controller 130 proceeds to S244C.

Controller 130 determines whether an SOC that vehicle 300 has when it is returned is equal to or larger than the reference value (S244C). If the SOC is equal to or larger than the reference value (YES in S244C), controller 130 applies the discount for leveling (S245C).

When the SOC is smaller than the reference value (NO in S244C), controller 130 applies the discount for leveling at a smaller discount rate than when the SOC is equal to or larger than the reference value (S246C). Note that when the SOC is smaller than the reference value, controller 130 may not apply the discount for leveling.

Note that controller 130 in S245C may determine a discount rate applied to the discount for leveling depending on a difference in magnitude between the departure zone SOC and the return zone SOC.

Furthermore, when the departure zone SOC is less than or equal to the return zone SOC, controller 130 may apply the discount for leveling at a discount rate smaller than when the departure zone SOC is larger than the return zone SOC. In that case, controller 130 may determine the discount rate applied to the discount for leveling depending on a difference in magnitude between the departure zone SOC and the return zone SOC.

This promotes a movement that is from a zone where vehicle 300 is rented to a zone having a smaller zone SOC, and can thus further level an uneven distribution caused between a zone SOC of a zone and that of another zone. Further, setting a large discount rate when vehicle 300 is returned with an SOC of a reference value or more remaining therein promotes returning vehicle 300 with an SOC of the reference value or more remaining therein. This allows the returned vehicle 300 to be electrically charged in a reduced period of time and hence utilized more efficiently.

While in the third modification the discount for leveling is applied when a departure zone SOC is larger than a return zone SOC, being capable of leveling an uneven distribution caused between a zone SOC of a zone and that of another zone suffices. An extra fee may be set when the departure zone SOC is less than or equal to the return zone SOC.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A fee setting device configured to set a utilization fee for sharing a vehicle configured to travel using power stored in a power storage device, comprising:
   a central processing unit (CPU), the CPU being programmed to:
   obtain, from the vehicle, a determined state of charge (SOC) information of the vehicle and position information of the vehicle;
   identify a zone where the vehicle is parked by using the position information obtained and zone setting information, the zone setting information dividing into a plurality of zones a predetermined region including a plurality of locations where the vehicle can be rented and returned;
   calculate, by using the determined SOC information of the vehicle, an amount representing a sum of the determined SOC informations stored in vehicles parked in the identified zone; and
   set the utilization fee, wherein
      when a second amount representing a sum of the determined SOC informations stored in vehicles parked in a zone including a return location of the vehicle is less than a first amount representing a sum of the determined SOC informations stored in vehicles parked in a zone including a renting location of the vehicle, the CPU being configured to set the utilization fee to be a smaller amount than when the second amount is larger than the first amount, the return location being a location where the vehicle has been returned, the renting location being a location where the vehicle has been rented;
      when the vehicle has shifted from a READY-OFF state to a READY-ON state, a controller of the vehicle transmits to the fee setting device start-of-utilization information serving as notification that utilization of the vehicle has started;
      when the vehicle has shifted from the READY-ON state to the READY-OFF state, the controller transmits to the fee setting device end-of-utilization information serving as notification that utilization of the vehicle has ended; and
      while the vehicle is in the READY-ON state and the power storage device is being charged, the controller periodically transmits to the fee setting device the determined SOC information of the vehicle and the position information obtained; and
   wherein the vehicle comprises the controller, and the controller is configured to:
      detect a voltage, a current, and a temperature of the power storage device, which is mounted on the vehicle; and
      determine the SOC information of the vehicle based on the detected voltage, the detected current, and the detected temperature.

2. The fee setting device according to claim 1, wherein when a first condition is that the second amount is smaller than the first amount and a direction from the zone including the renting location toward the zone including the return location is different from a demanded direction representing a direction in which movement between the zones concentrates vehicles, and a second condition is that the second amount is smaller than the first amount and the direction from the zone including the renting location toward the zone including the return location is identical to the demanded direction, the CPU is configured to set the utilization fee to be a smaller amount for the first condition than for the second condition.

3. The fee setting device according to claim 1, wherein when the vehicle is returned with power stored therein in an amount larger than a reference value, the CPU is configured to set the utilization fee to be a smaller amount than when the vehicle is returned with power stored therein in an amount smaller than the reference value.

4. The fee setting device according to claim 1, wherein when the zone including the return location has a total number of vehicles less than or equal to a predetermined number, the CPU is configured to set the utilization fee to be a smaller amount than when the zone including the return location has a total number of vehicles larger than the predetermined number.

5. A method for setting a utilization fee for sharing a vehicle configured to travel using power stored in a power storage device, the method comprising:
  detecting a voltage, a current, and a temperature of the power storage device, which is mounted on the vehicle;
  determining a state of charge (SOC) information of the power storage device mounted on the vehicle based on the detected voltage, the detected current, and the detected temperature;
  obtaining from the vehicle the determined SOC information of the vehicle and position information;
  identifying a zone where the vehicle is parked by using the obtained position information and zone setting information, the zone setting information dividing into a plurality of zones a predetermined region including a plurality of locations where the vehicle can be rented and returned;
  calculating, by using the determined SOC information of the vehicle, an amount representing a sum of the determined SOC informations stored in vehicles parked in the identified zone; and
  setting, by a computing system, the utilization fee, wherein the setting the utilization fee comprises:
    determining if a second amount, representing a sum of the determined SOC informations stored in vehicles parked in a zone including a return location of the vehicle, is less than a first amount, representing a sum of the determined SOC informations stored in vehicles parked in a zone including a renting location of the vehicle, the return location being a location where the vehicle has been returned, the renting location being a location where the vehicle has been rented;
    if the second amount is determined to be less than the first amount, then setting the utilization fee to be a third amount; and
    if the second amount is determined to be not less than the first amount, then setting the utilization fee to be a fourth amount;
  wherein the third amount is less than the fourth amount;
  the vehicle shifts from a READY-OFF state to a READY-ON state, and transmits start-of-utilization information serving as notification that utilization of the vehicle has started;
  the vehicle shifts from the READY-ON state to the READY-OFF state, and transmits to the fee setting device end-of-utilization information serving as notification that utilization of the vehicle has ended; and
  while the vehicle is in the READY-ON state, the power storage device is being charged, and the vehicle periodically transmits the determined SOC information of the vehicle and the position information obtained.

6. A fee setting system comprising:
  a vehicle configured to travel using power stored in a power storage device; and
  a central processing unit (CPU) configured to set a utilization fee for sharing the vehicle, wherein
  the vehicle comprises a controller, and the controller is configured to:
    detect a voltage, a current, and a temperature of the power storage device, which is mounted on the vehicle; and
    determine a state of charge (SOC) information of the power storage device mounted on the vehicle based on the detected voltage, the detected current, and the detected temperature; and
  the CPU is configured to:
    obtain from the vehicle the determined SOC information of the vehicle and position information of the vehicle;
    identify a zone where the vehicle is parked by using the obtained position information and zone setting information, the zone setting information dividing into a plurality of zones a predetermined region including a plurality of locations where the vehicle can be rented and returned;
    calculate, by using the determined SOC information of the vehicle, an amount representing a sum of the determined SOC informations stored in the vehicles parked in the identified zone;
    set the utilization fee;
    set the utilization fee to be a smaller amount when a second amount representing a sum of the determined SOC informations stored in vehicles parked in a zone including a return location of the vehicle is less than a first amount representing a sum of the determined SOC informations stored in vehicles parked in a zone including a renting location of the vehicle than when the second amount is larger than the first amount, the return location being a location where the vehicle has been returned, the renting location being a location where the vehicle has been rented;
  wherein:
    when the vehicle has shifted from a READY-OFF state to a READY-ON state, the controller transmits to the fee setting system start-of-utilization information serving as notification that utilization of the vehicle has started;
    when the vehicle has shifted from the READY-ON state to the READY-OFF state, the controller transmits to the fee setting system end-of-utilization information serving as notification that utilization of the vehicle has ended; and
    while the vehicle is in the READY-ON state and the power storage device is being charged, the controller periodically transmits to the fee setting system the determined SOC information of the vehicle and the position information obtained.

* * * * *